United States Patent [19]

Arima et al.

[11] Patent Number: 4,979,134

[45] Date of Patent: Dec. 18, 1990

[54] METHOD FOR MEASURING SURFACE TEMPERATURE OF SEMICONDUCTOR WAFER SUBSTRATE, AND HEAT-TREATING APPARATUS

[75] Inventors: Jiro Arima; Hiroji Tsujimura, both of Osaka; Tomonori Narita, Tokyo; Hiroki Takebuchi, Kawasaki, all of Japan

[73] Assignees: Minolta Camera Kabushiki Kaisha, Osaka; Tokyo Electron Limited, Tokyo, both of Japan

[21] Appl. No.: 380,026

[22] Filed: Jul. 14, 1989

[30] Foreign Application Priority Data

Jul. 15, 1988 [JP] Japan ................................. 63-176343

[51] Int. Cl.$^5$ .............................................. G01J 5/00
[52] U.S. Cl. .................................... 364/557; 250/339; 374/126; 356/45
[58] Field of Search .................... 364/557, 550, 551.01, 364/525; 374/126–129; 250/338.1, 339; 356/43, 45

[56] References Cited

U.S. PATENT DOCUMENTS

| | | | |
|---|---|---|---|
| 4,142,417 | 3/1979 | Cashdollar et al. | 365/45 X |
| 4,558,660 | 12/1985 | Nishizawa et al. | 219/411 X |
| 4,561,786 | 12/1985 | Anderson | 374/129 |
| 4,659,234 | 4/1987 | Brouwer et al. | 250/339 X |
| 4,708,474 | 11/1987 | Suarez-Gonzalez | 374/127 X |
| 4,708,493 | 11/1987 | Stein | 356/45 X |
| 4,729,668 | 3/1988 | Angel et al. | 374/127 X |
| 4,764,025 | 8/1988 | Jensen | 356/45 X |
| 4,791,585 | 12/1988 | Maki et al. | 356/43 X |
| 4,808,824 | 2/1989 | Sinnar | 250/339 |
| 4,883,963 | 11/1989 | Kemeny et al. | 250/339 |

FOREIGN PATENT DOCUMENTS 0139038 8/1983 Japan .................................. 374/127

*Primary Examiner*—Joseph L. Dixon
*Attorney, Agent, or Firm*—Oblon, Spivak, McClelland, Maier & Neustadt

[57] ABSTRACT

A method for measuring the surface temperature of a wafer substrate and a heat-treating apparatus are both used in a semiconductor device-manufacturing process wherein a reference light including infrared rays is intermittently emitted toward a wafer substrate. Infrared rays of a plurality of different types whose wavelengths are shorter than 1 μm and differ from each other are selectively detected from the reference light emitted toward the wafer substrate, the reference light reflected by the wafer substrate, and the light radiated from the wafer substrate itself. On the basis of the detection performed with respect to the emitted reference light, the reflected reference light and the radiated infrared rays, the surface temperature of the wafer substrate is calculated. A substrate-heating element is controlled on the basis of the calculated temperature.

13 Claims, 2 Drawing Sheets

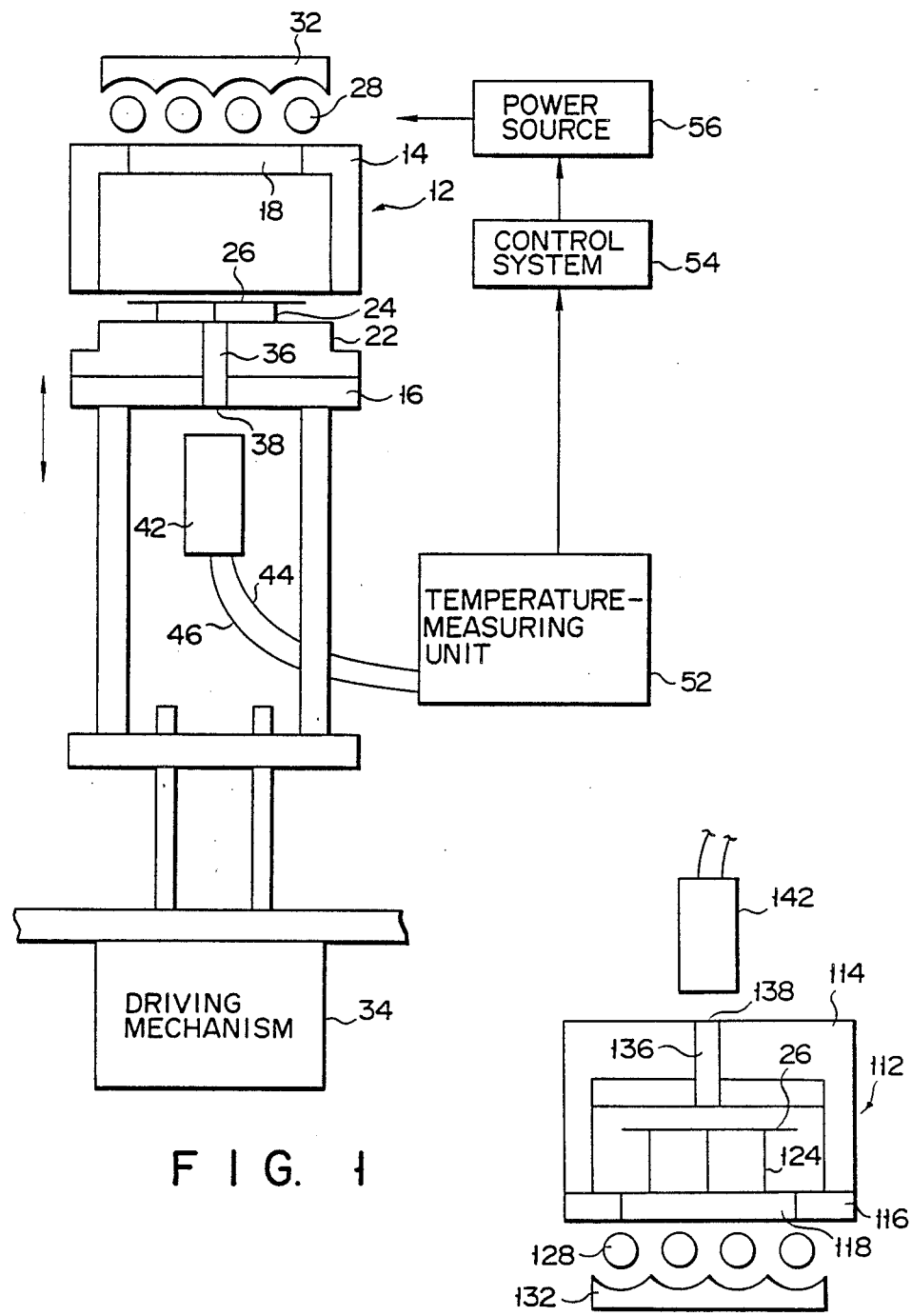
F I G. 1
F I G. 3

METHOD FOR MEASURING SURFACE TEMPERATURE OF SEMICONDUCTOR WAFER SUBSTRATE, AND HEAT-TREATING APPARATUS

BACKGROUND OF THE INVENTION

1. Field of the Invention

The present invention relates to a method for measuring the surface temperature of a semiconductor wafer substrate, and also to a heat-treating apparatus.

2. Description of the Related Art

In an apparatus which manufactures a semiconductor device by heat-treating a semiconductor wafer substrate, the treated condition of the substrate is dependent greatly on the treating temperature. Therefore, how the treating temperature is controlled an important factor in determining the characteristics of a semiconductor device. It should be noted that the surface on the major side of the substrate (i.e., the surface on which a thin film or the like is to be formed) constitutes an important portion of the semiconductor device to be manufactured. Therefore, the temperature of that surface has to be measured accurately and controlled in an optimal manner in the manufacturing process of the semiconductor device. (The surface on the major side of the substrate will be hereinafter referred to as a "major surface"; likewise the surface on the opposite side of the substrate will be hereinafter referred to as a "minor surface".)

To measure the temperature of a substrate treated in a semiconductor device-manufacturing apparatus, one prior art method employs a contact type thermometer in which a thermocouple is incorporated. The thermometer is arranged on the platen on which the substrate is mounted. In this prior art method, the temperature of the platen can be measured, but the temperature of the major surface of the substrate cannot be accurately measured since there is a large temperature difference between the platen and the major surface of the substrate. If the thermocouple of the thermometer is arranged not on the platen but on the major surface of the substrate, the temperature of the major surface may be measured with accuracy. In this case, however, the thermocouple will become a physical obstacle to the formation of films on the major surface. It should be also noted that the thermocouple is slow in reacting to a temperature change.

Another prior art method employs a non-contact type radiation thermometer. This radiation thermometer measures the temperature of the substrate by detecting infrared rays of e.g about 5 μm radiated from the substrate. In this method, it is necessary to know the emissivity of the substrate before the temperature measurement. However, if the emissivity of the substrate is unknown or if the emissivity varies in accordance with a change in the surface condition of the substrate (for example, the emissivity may be different before and after a film is formed on the surface of the substrate), it is difficult to accurately measure the temperature. In addition, since the radiation thermometer receives more infrared rays from the substrate bulk than from the film coated on the surface of the substrate, it is difficult to accurately measure the surface temperature itself.

SUMMARY OF THE INVENTION

Accordingly, an object of the present invention is to provide a temperature measuring method which enables the surface temperature of the substrate (the surface temperature being one of the most important conditions for manufacturing semiconductor devices) to be accurately measured, and also to provide a heat-treating apparatus using that temperature measuring method.

Another object of the present invention is to provide a temperature measuring method which does not adversely affect the heat treatment performed in the manufacture of semiconductor devices, and also to a heat-treating apparatus using that temperature measuring method.

To achieve these objects, a temperature measuring method of the present invention is included wherein infrared ray-including reference light is emitted toward a semiconductor wafer substrate and infrared rays of a plurality of different types whose wave-lengths are differ from each other are selectively detected among the infrared rays included in the reference light. Infrared rays having the same wavelengths as those of the selectively detected infrared rays are detected among the infrared rays included in the reference light reflected by the wafer substrate and among the infrared rays radiated by the wafer substrate itself. The infrared rays included in the reference light reflected by the wafer substrate from the infrared rays radiated by the wafer substrate itself are discriminated and the surface temperature of the water is calculated on the basis of the selectively detected infrared rays, the discriminated infrared rays included in the reflected reference light, and the discriminated infrared rays radiated by the wafer substrate.

A heat treatment apparatus of the present invention includes a heating element for heating the wafer substrate as well as an arrangement for intermittently emitting infrared ray-including reference light toward the wafer substrate. A detecting arrangement is provided for selectively detecting infrared rays of a plurality of different types whose wavelengths differ from each other, among the infrared rays included in the reference light. Additionally an arrangement is provided for detecting infrared rays having the same wavelengths as those of the selectively detected infrared rays, among the infrared rays included in the reference light reflected by the wafer substrate and the infrared rays radiated by the wafer substrate itself. A discriminating arrangement is also included for discriminating the infrared rays included in the reference light reflected by the wafer substrate from the infrared rays radiated by the wafer substrate itself as well as an arrangement for calculating the surface temperature of the wafer substrate on the basis of the selectively detected infrared rays, the discriminated infrared rays included in the reflected reference light, and the discriminated infrared rays radiated by the wafer substrate. A control controls the heating element on the basis of the calculated surface temperature. In the present invention, it is preferable that the reference light be comprised of infrared rays alone and that infrared rays of at least three wavelengths be detected for the temperature calculation.

Another heat treatment apparatus of the present invention includes a heating element for heating the wafer substrate and a light source for emitting light toward the wafer substrate. A measuring arrangement measures the temperature of the wafer substrate on the basis of light coming from the wafer substrate, taking into account the change of emissivity of the wafer substrate into consideration; and means for controlling the heating element in accordance with the temperature measured by the measuring means.

If the entirety of a region predetermined on the substrate surface is scanned, the temperature distribution in that region can be detected. Moreover, if the major and minor surfaces of the wafer substrate are heated under substantially the same condition, the temperature information for controlling the heating means can be obtained by measuring the temperature of the minor surface of the substrate.

Other features and advantages of the present invention will become apparent from a reading of the following descriptions given with reference to the accompanying drawings.

BRIEF DESCRIPTION OF THE DRAWINGS

FIG. 1 is a schematic view of a lamp anneal apparatus according to the first embodiment of the present invention;

FIG. 3 is a schematic view of another type of lamp anneal apparatus according to the second embodiment of the present invention.

DETAILED DESCRIPTION OF THE PREFERRED EMBODIMENTS

Figure 2:
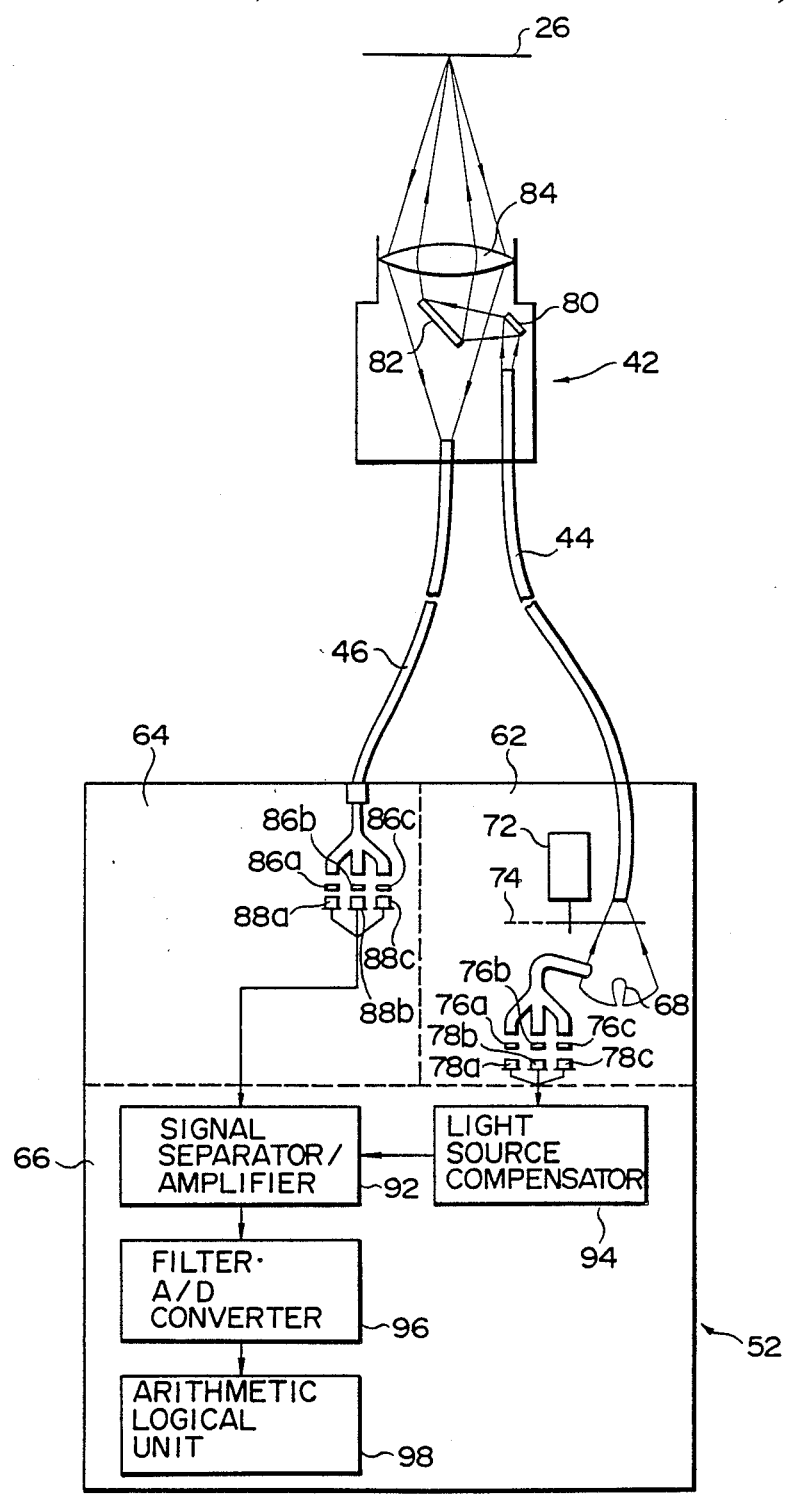
FIG. 2 is a view of the temperature measuring unit employed in the apparatus shown in FIG. 1.

As is shown in FIG. 1, the lamp anneal apparatus according to the first embodiment of the present invention comprises chamber 12 for defining sealed space. To produce an atmosphere suitable for heat treatment, a pressure-reducing pipe, a gas-supplying pipe, and other pipes (none of which are shown) are connected to chamber 12. Chamber 12 is made up of cylindrical member 14 having a substantially circular cross section, and diskshaped lid 16 for air-tightly closing the lower opening of cylindrical member 14.

Illumination window 18 formed of quartz glass is provided in the upper face of cylindrical member 14, and the inner faces of cylindrical member 14 are formed to be specular. Platen 22 having a circumferential shape complementary to the lower opening of cylindrical member 14 is located on the upper side of lid 16. The upper surface of platen 22 is also formed to be specular. A plurality of pins 24 (e.g., three pins) stand upright on platen 22, and wafer substrate 26 is supported on pins 24, with its major surface facing upward. Therefore, substrate 26 is supported with a certain space maintained between platen 22 and substrate 26. Infrared ray lamp 28 having reflector 32 is arranged above illumination window 18 of chamber 12, and the infrared rays emitted from lamp 28 are guided into the internal region of chamber 12 through window 18. The inner faces of cylindrical member 14 and the upper surface of platen 22 reflect the infrared rays, so that wafer substrate 26 on pins 24 is heated with the infrared rays incident thereon in all directions.

Lid 16 is connected to driving mechanism 34 and is vertically movable. When lid 16 is moved to the uppermost position by the driving mechanism (34), it closes the lower opening of cylindrical member 14, so that the interior of chamber 12 is sealed. Conversely, when lid 16 is moved to the lowermost position by the driving mechanism (34), chamber 12 is opened, permitting substrate 12 to be mounted on pins 24 or removed therefrom. Examination hole 36, having a diameter of several centimeters, is formed substantially in the centers of lid 16 and platen 22. The lower end of this examination hole is sealed by examination window 38 formed of quartz glass or the like. Located under examination window 38 is optical head 42 which emits reference light, e.g., infrared rays, toward the reverse side of wafer substrate 26 through examination hole 36. The light emitted from optical head 42 and the light reflected to optical head 42 are both detectable. Optical head 42 is connected to temperature-measuring unit 52 through two optical fibers 44 and 46. Temperature-measuring unit 52 calculates the results of the measurement in the manner mentioned hereinafter, and the calculated results are supplied to control system 54. On the basis of the results of the measurement, control system 54 controls power source 56 that supplies power to infrared ray lamp 28.

As mentioned above, infrared rays are incident on wafer substrate 26 in all directions. Therefore, it can be assumed that the temperature of the major surface of wafer substrate 26 and that of the minor surface are substantially the same. In the apparatus mentioned above, infrared ray lamp 28 is so arranged as to illuminate the major surface of wafer substrate 26. In the case of this construction, it is more desirable to detect the temperature of the minor surface of wafer substrate 26 than to detect the temperature of the major surface. In the above embodiment, therefore, the luminous intensity of infrared ray lamp 28 is controlled on the basis of the temperature measured with respect to the reverse side (i.e., the minor surface) of wafer substrate 26.

The temperature calculating principles used by temperature-measuring unit 52 of the present invention are disclosed in U.S. patent application No. 07/203,003 which were filed by Makino et al on June 6, 1988. The disclosure in this U.S. patent application is incorporated in its entirety in this application by reference.

Temperature-measuring unit 52 is made up of light source section 62, light-receiving section 64, and signal processing section 66.

In light source section 62, the reference light emitted from light source 68 (which is constituted by a halogen lamp, for example) is chopped by slit-provided disk 74 rotated by motor 72, and is supplied to optical head 42 through optical fibers 44 and 46. The reference light emitted from light source 68 is monitored by use of a plurality of filters (each of which allows transmission of infrared rays having wavelengths less than 1 μm) and a plurality of optical sensors. In the case of this embodiment, three filters 76a–76c permitting infrared rays having wavelengths of 0.8 μm, 0.9 μm, and 1.0 μm to be transmitted therethrough, respectively, are employed, and three optical sensors 78a–78c are arranged in correspondence to the respective filters.

The reference light supplied to optical head 42 passes via reflecting mirrors 80 and 82 and lens 84, and is then incident on wafer substrate 26. After reflected by wafer substrate 26, the reference light is supplied to light-receiving section 64 of temperature-measuring unit 52 through lens 84 and optical fiber 46. At this time, infrared rays radiated from substrate 26 itself are also supplied to light-receiving section 64, together with the reference light reflected by wafer substrate 26. In light-receiving section 64, the light is made to pass through filters 86a–86c (which have the same light transmission characteristics as those of filters 76a–76c, respectively), so that the light is divided into light components having wavelengths of 0.8 μm, 0.9 μm, and 1.0 μm, respectively. The respective light components are measured by optical sensors 88a–88c. Incidentally, the reason that infrared rays having wavelengths of less than 1 μm are selectively detected is that infrared rays having longer wavelengths, such as wavelengths of 5 μm, would be transmitted through the silicon wafer substrate.

The signals measured by optical sensors 88a–88c are supplied to signal separator/amplifier 92 of signal processing section 66. The signals measured by optical sensors 78a–78c (i.e., the light emitted from light light source 68) are supplied to light source compensator 94 of signal processing section 66. The signals measured by optical sensors 88a–88c are processed such that a signal corresponding to the light reflected by wafer substrate 26 and a signal corresponding to the infrared rays radiating from wafer substrate 26 are separated from each other in synchronism with the period of the chopping performed in light source section 62. The signals, thus separated, are amplified. The signal corresponding to the reflected light is corrected on the basis of the signal supplied from signal source compensator 94, so as to remove a variation component arising from light source 68.

An output of signal separator/amplifier 92 is supplied to filter . A/D converter 96, where the output signal is cleared of any noise components and is then converted into a digital signal. This digital signal is supplied to arithmetic logical unit 98.

Arithmetic logical unit 98 calculates the temperature in the manner below.

Let it be assumed that $P(\lambda_i)$ (i=1, 2, 3) each denote a wavelength, $P(\lambda_i)$ denotes a D.C. voltage applied in correspondence to the beam of light emitted from a light source, $D(\lambda_i)$ denotes a D.C. voltage applied in correspondence to the beam of light radiated from an object, $R(\lambda_i)$ denotes an A.C. voltage applied in correspondence to the beam of light reflected by the object, $\epsilon(\lambda_i)$ denotes an emissivity, and $\rho(\lambda_i)$ denotes a reflectance. If the object does not permit any light to be transmitted therethrough, the following equation is established:

$$\epsilon(\lambda_i) + \rho(\lambda_i) = 1, (i=1, 2, 3) \qquad (1)$$

To calculate reflectance $\rho(\lambda_i)$, all the light beams incident on the object and all the light beams reflected by the object in a semi-sphere space must be measured. If partial reflectance $L(\lambda_i)$ related only to the measurement is defined as follows:

$$L(\lambda_i) = R(\lambda_i)/P(\lambda_i) \qquad (2)$$

then it can be represented by:

$$L(\lambda_i) = \beta(\lambda_i) \cdot \rho(\lambda_i) \qquad (3)$$

where $\beta(\lambda_i)$ is data related to the angles at which the reflected light distributes; specifically it represents a ratio of the reflected light beam within a measurement solid angle to the light beams reflected in a semisphere space. From formulas (1) and (3), the emissivity can be expressed by the following formula:

$$\epsilon(\lambda_i) = 1 - [1/\beta(\lambda_i)]L(\lambda_i)$$

The $1/\beta(\lambda_i)$" can be expressed by the following polynomial of "wavelength" terms:

$$1/\beta(\lambda_i) = a_0 + a_1\lambda_i 1 + \ldots + a_n\lambda_i n \qquad (4)$$

It should be noted that a change in $\beta(\lambda_i)$ due to wavelengths is very small in comparison with a change in $\rho(\lambda_i)$, and that it is not dependent on the wavelengths as a matter of fact, as long as the wavelengths are close to each other. Therefore, the following approximate expression can be obtained:

$$1/\beta(\lambda_i) = a_0 \qquad (5)$$

Hence, $$\epsilon(\lambda_i) = 1 - a_0 \cdot L \qquad (6)$$

If it is assumed that $D_0(\lambda_i, T)$ represents the voltage produced when a black body ($\epsilon = 1$) having temperature T is measured, then the following formula is obtained:

$$\epsilon(\lambda_i) \cdot D_0(\lambda_i, T) = D(\lambda_i) \qquad (7)$$

The method of least squares is used as set forth below. If a function for evaluating an error between an estimated value $\epsilon(\lambda_i) \cdot D_0(\lambda_i, T)$ of a radiating light beam and a measured value $D(\lambda_i)$ of the radiating light beam is defined as below, $$h(T) = \{\Sigma[(\epsilon(\lambda_i) \cdot D_0(\lambda_i, T) - D(\lambda_i))/D(\lambda_i)]^2/3\}^{\frac{1}{2}}$$

then the following formula is obtained:

$$h(T) = \{\Sigma[((1 - a_0 \cdot L(\lambda_i)) \cdot D_0(\lambda_i, T) - D(\lambda_i))/D(\lambda_i)]^2/3\}^{\frac{1}{2}} \qquad (8)$$

The temperature of wafer substrate 26 can be obtained by calculating the value of T which makes h(T) in formula (8) minimum.

To treat wafer substrate 26, the procedures below are followed. First of all, lid 16 is moved to the lowermost position by the driving mechanism (34), and wafer substrate 26 is mounted on pins 24 by use of a transporting device (not shown) provided independently of the subject apparatus. Next, lid 16 is raised by the driving mechanism (34), so as to seal the interior of chamber 12. A predetermined gaseous atmosphere having a predetermined pressure is produced in the interior of chamber 12 through the pressure-reducing pipe and the gas-supplying pipe. Thereafter, the infrared rays are emitted from infrared ray lamp 28 and are guided into chamber 12 through illumination window 18, whereby wafer substrate 26 is annealed.

During the annealing process, the reverse side of wafer substrate 26 is irradiated with the reference light emitted from optical head 42, so as to measure the temperature of the minor surface of wafer substrate 26 (i.e., the surface on the reverse side of wafer substrate 26). Results of this measurement are supplied to control system 54, and this control system controls power source 56 such that wafer substrate 26 is heated at a predetermined temperature. Even if the emissivity of wafer substrate 26 is unknown, the temperature of the minor surface of wafer substrate 26 can be accurately measured.

FIG. 3 is a partial illustration of a second embodiment wherein the temperature of the major surface of a wafer substrate, not that of the minor surface, is measured. In the case of the embodiment shown in FIG. 1, the luminous intensity of lamp 28 is controlled on the basis of the temperature measured with respect to the minor surface of wafer substrate 26. This control is based on the assumption that the temperature of the major surface of substrate 26 and that of the minor surface of substrate 26 are substantially the same because infrared rays are incident on substrate 26 in all directions. However, there may arise the necessity of measuring the temperature of the major surface of substrate 26, depending upon the manner in which the heat-treating process is performed or the type of the heat-treating apparatus. In the second embodiment illustrated in FIG. 3, the lamp anneal apparatus operates on the same principles as that of the apparatus of the first embodiment, but the temperature of the major surface of the wafer substrate is measured. This temperature measuring process is suitable for use in a susceptor type heating apparatus wherein the major surface and the minor surface of a wafer substrate are heated under different conditions.

The lamp anneal apparatus used in the embodiment illustrated in FIG. 3 comprises chamber 112 for defining a sealed spaced. To produce an atmosphere necessary for heat treatment, a pressure-reducing pipe, a gas-supplying pipe, and pipes of other types (none of the pipes being shown) are connected to chamber 112. Chamber 112 is made up of cylindrical lid 11 whose cross section is substantially circular, and discoid substrate base 116 which can air-tightly close the lower opening of lid 114.

The inner side face and inner upper face of cylindrical lid 114 are formed to be specular. Substrate base 116 is provided with illumination window 118 formed of quartz glass in the center thereof. A plurality of pins 124 (e.g., three pins) stand upright on illumination window 118. Wafer substrate 26 is supported on pins 124 with its major surface facing upward. Therefore, when substrate 26 is supported, a certain space is maintained between illumination window 118 and substrate 26. Infrared ray lamp 128 having reflector 132 is arranged under illumination window 118 of chamber 112, and the infrared rays emitted from lamp 128 is guided into the internal region of chamber 112 through window 118. The inner side face and the inner upper face of cylindrical chamber 114 reflect the infrared rays, so that wafer substrate 26 supported on pins 24 is heated with the infrared rays incident thereon in all directions.

Cylindrical lid 114 is connected to a driving mechanism (not shown) and is vertically movable. When cylindrical lid 114 is moved to the lowermost position by the driving mechanism, its lower opening is closed by substrate base 116, so that the interior of chamber 112 is sealed. Conversely, when cylindrical lid 114 is moved to the uppermost position by the driving mechanism, chamber 112 is opened, permitting substrate 26 to be mounted on pins 124 or removed therefrom Examination hole 136 having a diameter of several centimeters is formed substantially in the center of the top wall of cylindrical lid 114. Examination hole 136 is sealed by examination window 138 formed of quartz glass or the like. Located above examination window 138 is optical head 142 which emits reference light (e.g., infrared rays) toward the obverse side of wafer substrate 26 through examination hole 136. The light emitted from optical head 142 and the light reflected to optical head 142 are both detectable. Optical head 142 is connected to a temperature-measuring unit (not shown) through two optical fibers. The temperature-measuring unit calculates results of the measurement in the manner mentioned above, and the calculated results are supplied to a control system (not shown). On the basis of the results of measurement, the control system controls a power source (not shown) that supplies power to infrared ray lamp 128.

The construction of the temperature-measuring unit, the temperature-measuring process used by the unit, and the temperature control performed on the basis of the measured temperature data are similar to those of the embodiment shown in FIG. 1, so that an explanation of them will be omitted.

In the embodiment shown in FIG. 3, the reference light emitted from optical head 142 is guided to the obverse side (i.e., the major surface) of wafer substrate 26, and the temperature of the major surface is measured in the manner mentioned above. Although the emissivity of wafer substrate 26 may greatly vary, depending upon the condition of a film formed on the major surface, the apparatus according to the second embodiment can accurately measure the temperature of the major surface of wafer substrate 26. As mentioned above, measurement of the temperature of the major surface of wafer substrate 26 is of importance in the case of an apparatus wherein the major surface and the minor surface of a wafer substrate are heated under different conditions, as in a susceptor type heating apparatus.

In the foregoing, the present invention was described in detail, referring to the preferred embodiments shown in the accompanying drawings. Needless to say, however, the present invention is not limited to the embodiments described above and may be modified or improved in various manners without departing from the spirit and subject matter of the invention. For instance, although the present invention was described as being embodied as lamp anneal apparatuses, it may be applied to any type of heat-treating apparatuses as long as these apparatuses are used for heat-treating semiconductor wafer substrates. Of course, the wavelengths of the infrared rays used for the temperature measurement will have to be controlled in accordance with the heating temperature. Moreover, the measurement may not be carried out only on a single point on a substrate. If the entirety of a predetermined surface region of the substrate is scanned, it becomes possible to know the thermal distribution in that surface region.

What is claimed is:

1. A method for measuring a surface temperature of a semiconductor wafer substrate, comprising the steps of:
    emitting infrared ray-including reference light toward the semiconductor wafer substrate;
    selectively detecting infrared rays of a plurality of kinds whose wavelengths are differ from each other, among the infrared rays included in the reference light;
    detecting infrared rays having the same wavelengths as those of the selectively detected infrared rays, among the infrared rays included in the reference light reflected by the wafer substrate and among the infrared rays radiated by the wafer substrate itself;
    discriminating the infrared rays included in the reference light reflected by the wafer substrate from the infrared rays radiated by the wafer substrate itself; and
    calculating the surface temperature of the wafer substrate on the basis of the selectively detected infrared rays, the discriminated infrared rays included in the reflected reference light, and the discriminated infrared rays radiated by the wafer substrate.

2. A method according to claim 1, wherein the reference light is comprised of infrared rays alone.

3. A method according to claim 1, wherein the calculation of the surface temperature is performed on the basis of infrared rays of at least three different wavelengths.

4. A method according to claim 1, wherein the entirety of a predetermined surface region of the wafer substrate is scanned for detecting the infrared rays having the same wavelengths.

5. A method according to claim 1, wherein the selectively detecting step detects infrared rays of the plurality kinds whose wavelengths are shorter than 1 μm.

6. An apparatus for heat-treating a semiconductor wafer substrate, comprising:
means for heating the wafer substrate;
means for intermittently emitting infrared rayincluding reference light toward the wafer substrate;
means for selectively detecting infrared rays of a plurality of kinds whose wavelengths are differ from each other, among the infrared rays included in the reference light;
means for detecting infrared rays having the same wavelengths as those of the selectively detected infrared rays, among the infrared rays included in the reference light reflected by the wafer substrate and the infrared rays radiated by the wafer substrate itself;
means for discriminating the infrared rays included in the reference light reflected by the wafer substrate from the infrared rays radiated by the wafer substrate itself;
means for calculating the surface temperature of the wafer substrate on the basis of the selectively detected infrared rays, the discriminated infrared rays included in the reflected reference light, and the discriminated infrared rays radiated by the wafer substrate; and
means for controlling the heating means on the basis of the calculated surface temperature.

7. An apparatus according to claim 6, wherein the reference light is comprised of infrared rays alone.

8. An apparatus according to claim 6, wherein the calculation of the surface temperature is performed on the basis of infrared rays of at least three different wavelengths.

9. An apparatus according to claim 6, wherein the entirety of a predetermined surface region of the wafer substrate is scanned for detecting the infrared rays having the same wavelengths.

10. An apparatus according to claim 6, wherein temperature information used for controlling the heating means is derived by measuring the temperature of a minor surface of the wafer substrate, on the assumption that a major surface and the minor surface of the wafer substrate are heated under substantially the same condition.

11. An apparatus according to claim 6, wherein the selectively detecting means detects infrared rays of the plurality kinds whose wavelengths are shorter than 1 μm.

12. An apparatus for heat-treating a semiconductor wafer substrate, comprising:
means for emitting light toward the wafer substrate;
means for measuring the temperature of the wafer substrate on the basis of light coming from the wafer substrate with taking change of emissivity of the wafer substrate into consideration; and
means for controlling the heating means in accordance with the temperature measured by the measuring means.

13. An apparatus according to claim 12, wherein,
the emitting means includes means for intermittently emitting infrared ray-including reference light toward the wafer substrate; and
the measuring means includes:
first means for selectively detecting infrared rays of a plurality of kinds whose wavelengths are shorter than 1 μm and differ from each other among the infrared ray-including reference light emitted by the emitting means;
second means for detecting infrared rays having the same wavelengths as those of the selectively detected infrared rays among light coming from the wafer substrate, said light coming from the wafer substrate including both of the infrared ray-including reference light reflected by the wafer substrate and light radiated by the wafer substrate itself;
means for discriminating the infrared rays included in the infrared ray-including reference light reflected by the wafer substrate from the infrared rays radiated by the wafer substrate itself; and
means for calculating the surface temperature of the wafer substrate on the basis of the infrared rays detected by the first detecting means, the reflected infrared rays which is detected by the second detecting means and discriminated by the discriminating means, and the radiated infrared rays which is detected by the second detecting means and discriminated by the discriminating means.

* * * * *